(12) United States Patent
Slama et al.

(10) Patent No.: US 10,485,264 B2
(45) Date of Patent: Nov. 26, 2019

(54) HYDROPHOBIC ROLLING PAPERS

(71) Applicant: PHILIP MORRIS PRODUCTS S.A., Neuchatel (CH)

(72) Inventors: Philippe Slama, Pully (CH); Alen Kadiric, Orpund (CH)

(73) Assignee: Philip Morris Products S.A., Neuchatel (CH)

( * ) Notice: Subject to any disclaimer, the term of this patent is extended or adjusted under 35 U.S.C. 154(b) by 208 days.

(21) Appl. No.: 15/536,010

(22) PCT Filed: Dec. 16, 2015

(86) PCT No.: PCT/IB2015/059702
§ 371 (c)(1),
(2) Date: Jun. 14, 2017

(87) PCT Pub. No.: WO2016/142759
PCT Pub. Date: Sep. 15, 2016

(65) Prior Publication Data
US 2017/0360082 A1 Dec. 21, 2017

Related U.S. Application Data

(60) Provisional application No. 62/096,203, filed on Dec. 23, 2014.

(51) Int. Cl.
A24D 1/02 (2006.01)
D21H 21/16 (2006.01)
(Continued)

(52) U.S. Cl.
CPC .............. A24D 1/022 (2013.01); A24D 1/025 (2013.01); C09J 7/21 (2018.01); C09J 7/32 (2018.01);
(Continued)

(58) Field of Classification Search
None
See application file for complete search history.

(56) References Cited

U.S. PATENT DOCUMENTS 4,107,426 A 8/1978 Gordon
5,060,674 A * 10/1991 Brown ..................... A24D 1/02
131/365
(Continued)

FOREIGN PATENT DOCUMENTS

CN 101538450 A 9/2009
CN 101707899 A 5/2010
(Continued)

OTHER PUBLICATIONS

International Search Report and Written Opinion for PCT/IB2015/059702, issued by the European Patent Office, dated May 6, 2016, 13 pgs.
(Continued)

Primary Examiner — Dennis R Cordray
(74) Attorney, Agent, or Firm — Mueting, Raasch & Gebhardt P.A.

(57) ABSTRACT

A rolling paper includes a hydrophobic substrate region comprising hydrophobic groups covalently bonded to the rolling paper, and a moisture-activated adhesive adjacent to the hydrophobic substrate region and longitudinal edge of the rolling paper.

16 Claims, 1 Drawing Sheet

(51) Int. Cl.
*D21H 19/10* (2006.01)
*D21H 19/76* (2006.01)
*C09J 7/00* (2018.01)
*D21H 27/00* (2006.01)
*D21H 17/00* (2006.01)
*C09J 7/21* (2018.01)
*C09J 7/32* (2018.01)

(52) U.S. Cl.
CPC ............... *D21H 5/16* (2013.01); *D21H 17/00* (2013.01); *D21H 19/10* (2013.01); *D21H 19/76* (2013.01); *D21H 21/16* (2013.01); *C09J 2400/283* (2013.01); *C09J 2405/00* (2013.01)

(56) References Cited

U.S. PATENT DOCUMENTS

| | | | | |
|---|---|---|---|---|
| 5,595,196 | A * | 1/1997 | Salonen | A24C 5/565 131/362 |
| 5,657,773 | A * | 8/1997 | George | A24C 5/40 131/260 |
| 6,638,613 | B1 * | 10/2003 | Bland | A24B 15/282 428/34.3 |
| 9,930,910 | B2 | 4/2018 | Gindrat | |
| 2010/0071712 | A1 * | 3/2010 | White | A24F 19/0028 131/237 |
| 2013/0112216 | A1 * | 5/2013 | Clarke | A24D 3/18 131/331 |
| 2013/0236647 | A1 | 9/2013 | Samain et al. | |
| 2013/0345415 | A1 * | 12/2013 | Trigiante | D21H 25/06 536/63 |

FOREIGN PATENT DOCUMENTS

| | | |
|---|---|---|
| CN | 103561593 A | 2/2014 |
| CN | 103589367 A | 2/2014 |
| CN | 104 005 256 A | 8/2014 |
| EP | 0 231 664 A1 | 8/1987 |
| EP | 0 706 766 A2 | 4/1996 |
| EP | 1 044 615 A1 | 10/2000 |
| FR | 2 232 177 A5 | 12/1974 |
| GB | 1 261 400 A | 1/1972 |
| WO | WO 88/01478 A1 | 3/1988 |
| WO | WO 97/21362 A1 | 6/1997 |
| WO | WO 2008/150130 A1 | 12/2008 |
| WO | WO 2011/154697 A1 | 12/2011 |
| WO | WO 2014/001874 A1 | 1/2014 |

OTHER PUBLICATIONS

Cunha et al., "Turning polysaccharides into hydrophobic materials: a critical review. Part 1. Cellulose," *Cellulose*, Jul. 11, 2010;17(5):875-889.

International Preliminary Report on Patentability for PCT/IB2015/059702, issued by the International Bureau of WIPO, dated Jul. 6, 2017, 7 pgs.

Chinese First Office Action issued by the Chinese Patent Office for CN Application No. 201580067521.1, dated May 22, 2019; 20 pgs. Including English translation.

* cited by examiner

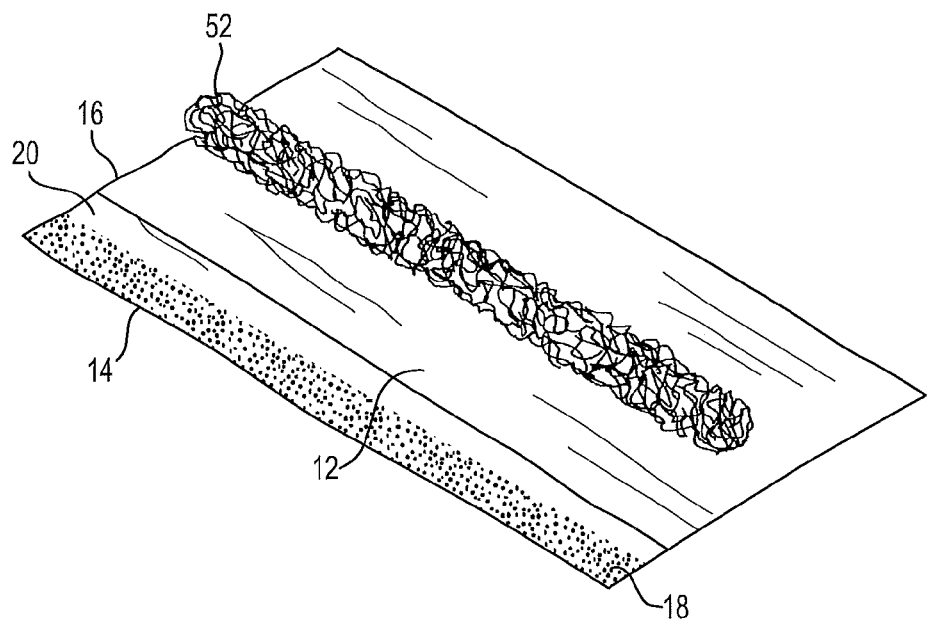

HYDROPHOBIC ROLLING PAPERS

This application is the § 371 U.S. National Stage of International Application No. PCT/IB2015/059702, filed 16 Dec. 2015, which claims the benefit of U.S. Provisional Application No. 62/096,203, filed 23 Dec. 2014, the disclosures of which are incorporated by reference herein in their entireties.

The present disclosure relates to a hydrophobic rolling paper for use in making self-rolled cigarettes.

Combustible smoking articles, such as cigarettes, typically comprise a cylindrical rod of tobacco cut filler surrounded by a wrapper and a cylindrical filter axially aligned in an abutting end-to-end relationship with the wrapped tobacco rod. The cylindrical filter typically comprises a filtration material circumscribed by a plug wrap. The wrapped tobacco rod and the filter are joined by a band of tipping wrapper, normally formed of a paper material that circumscribes the entire length of the filter and an adjacent portion of the wrapped tobacco rod. A cigarette is employed by a consumer by lighting one end thereof and burning the shredded tobacco rod. The smoker then receives mainstream smoke into their mouth by drawing on the mouth end or filter end of the cigarette.

Substrates for rolling tobacco products or smokable material are known. Such substrates can be natural or manufactured. For example, it is known to use a raw tobacco leaf to roll your own cigar. Likewise, it is known to use manufactured tobacco rolling substrates for the same purpose. Smokers often use a variety of terms to refer to tobacco rolling substrates, including "rolling paper," "cigarette paper," "cigar wraps," "wraps" and the like. Generally speaking, these substrates are small sheets, rolls, or leaves of paper substrate that are packaged and sold for rolling smokable product into a cigarette form. Typically, the rolling process is accomplished either by hand or with the aid of a rolling apparatus. Rolling paper is offered for those people who prefer to roll their own cigarette or cigar, where the person can customize the cigarette or cigar using any blend of smokable product rolled into any shape and size they prefer.

During the process of rolling a smoking article (for example a cigarette), an individual sheet of rolling paper may be filled with a smokable product. A filter element can optionally be included in the smoking article formation. The smoking article is formed by wetting (typically by licking) an adhesive strip on the rolling paper and overlaying it onto the rolling paper to form the smoking article. Rolling paper is susceptible to wetting, and excessively wetting the rolling paper can weaken the rolling paper and lead to wrinkling, tearing or staining of the rolling paper. Packages of rolling paper, where rolling paper is stacked upon each other to form a stack, has a tendency to stick together. This is especially true in hot and humid environments.

It would be desirable to provide rolling paper that resisted water or moisture absorption. It is also desirable to provide rolling paper that did not stick to each other when stacked together. It would also be desirable that the rolling paper not affect the taste of the smoke or aerosol generated by the rolled smoking article.

According to a first aspect, a rolling paper includes a hydrophobic substrate region comprising hydrophobic groups covalently bonded to the rolling paper, and a moisture-activated adhesive adjacent to the hydrophobic substrate region and longitudinal edge of the rolling paper.

In another aspect, a rolling paper includes a hydrophobic substrate region where the hydrophobic substrate region has a water contact angle of at least about 90 degrees or at least about 100 degrees and a Cobb measurement value (at 60 seconds) of about 40 $g/m^2$ or less, or about 35 $g/m^2$ or less.

In a further aspect, a rolling paper hydrophobic substrate region is produced by a process comprising the steps of: applying a liquid composition comprising a fatty acid halide to at least one surface of a rolling paper and maintaining the surface at a temperature of about 120° C. to about 180° C. The fatty acid halide reacts in situ with protogenic groups of material in the rolling paper resulting in the formation of fatty acid esters.

Rolling paper that includes a hydrophobic substrate region can reduce wetting or absorption of water or moisture when the moisture activated adhesive is wetted, by licking for example. As a result, the structural properties of the rolling paper are maintained. The hydrophobic substrate region can also prevent adjacent rolling paper from sticking to each other. The hydrophobic substrate region does not negatively affect the taste of the mainstream smoke or aerosol generated by the rolled smoking article and perceived by a consumer consumption of the rolled smoking article.

Smoking articles in accordance with the present disclosure may be cigarettes or other smoking articles in which tobacco material forming a tobacco substrate or tobacco rod is combusted to form mainstream smoke. Rolling paper contains the smokable material and optionally a filter element. The term "smoking article" is used here to indicate cigarettes, cigars, cigarillos and other articles in which a smokeable material, such as a tobacco, is lit and combusted to produce smoke.

The term "tobacco" shredded tobacco or tobacco cut filler, or it may include reconstituted tobacco or cast leaf tobacco, or a mixture of both.

The term "mainstream smoke" is used herein to indicate smoke produced by combustible smoking articles, such as cigarettes. Mainstream smoke flows through the smoking article and is consumed by the user.

The term "rolling paper" is used herein to define a wrap which circumscribes the tobacco. The terms "rolling paper," "cigarette paper," "cigar wraps," "tobacco rolling substrate," and "wraps" are all synonymous.

The term "hydrophobic" refers to a surface exhibiting water repelling properties. One useful way to determine this is to measure the water contact angle. The "water contact angle" is the angle, conventionally measured through the liquid, where a liquid/vapour interface meets a solid surface. It quantifies the wettability of a solid surface by a liquid via the Young equation.

The present disclosure provides a hydrophobic rolling paper for forming a rolled smoking article. In one embodiment of the invention, the rolling paper can have one or more substrate regions that are hydrophobic. In another embodiment of the invention, the rolling paper can have one or more substrate regions that are hydrophobic and one or more substrate regions that are not hydrophobic. A moisture-activated adhesive is adjacent to the hydrophobic substrate region. A moisture-activated adhesive can also optionally be disposed on the hydrophobic substrate region. Hydrophobic groups are covalently bonded to protogenic groups, such as hydroxyl groups, on the cellulosic material forming the rolling paper to provide the hydrophobic property.

It is contemplated that the hydrophobic rolling paper can reduce and prevent water and moisture retention or adsorption from the water or moisture wetting the moisture-activated adhesive. The rolling paper also does not negatively affect the taste of the mainstream smoke or aerosol generated by the smoking article and perceived by a consumer consuming the smoking article.

The hydrophobic rolling paper can also inhibit the transfer, absorption and accumulation of humectant, water and staining that can occur when the rolling paper or rolled smoking article is stored or utilized in a humid environment, particularly where the humidity is very high (e.g., relative humidity greater than 70%, 80%, 90%, 95%, 99%) or when the rolled smoking article is stored for an extended period, (e.g., more than 24 hours, two days, one week, or one month), or a combination of such conditions.

The rolling paper includes a moisture-activated adhesive on at least one major surface of the rolling paper. The moisture-activated adhesive can be applied resulting in the formation of a strip of material on the rolling paper. The moisture-activated adhesive can also be applied to the rolling paper in a way that results in the formation of a dis-continuous strip of material. The moisture-activated adhesive can be directly applied as a continuous strip of material or a dis-continuous strip of material. The continuous strip or dis-continuous strip of material can be co-extensive with and adjacent to a longitudinal edge of the rolling paper. The moisture-activated adhesive can be flavor-free or scent-free to minimize any adverse effects of the adhesive composition on the smoking experience. Alternatively, the moisture-activated adhesive can be enhanced by adding a flavoring or scent thereto to enhance the smoking experience.

Moisture-activated adhesives are known. Illustrative moisture-activated adhesive include, sugar solutions, polysaccharides, starch, and gums. Gums include guar gum and gum arabic and the like. When water or moisture contacts a moisture-activated adhesive, the bonding agent in the moisture-activated adhesive is activated and adheres to a substrate contact the activated adhesive. Preferably, the moisture-activated adhesive comprises water-remoistenable natural gums, such as gum arabic.

The moisture-activated adhesive can be applied onto a hydrophobic substrate region of the rolling paper. Surprisingly the moisture-activated adhesive can bond to a hydrophobic substrate region of the rolling paper. In many embodiments the moisture-activated adhesive is applied as a strip of moisture-activated adhesive along a longitudinal edge of the rolling paper and on a hydrophobic substrate region of the rolling paper, where the hydrophobic substrate region of the rolling paper extends beyond the strip of moisture-activated adhesive and the strip of moisture-activated adhesive separates at least a portion of the hydrophobic substrate region from the longitudinal edge of the rolling paper. In many embodiments the hydrophobic substrate region of the rolling paper extends at least about 2 mm or at least about 5 mm or at least about 10 mm away from the strip of moisture-activated adhesive.

The moisture-activated adhesive layer has any useful length. In many embodiments the moisture-activated adhesive layer has a length that is co-extensive with the longitudinal length of the rolling paper. The moisture-activated adhesive layer has any useful thickness. In many embodiments the moisture-activated adhesive layer has a thickness in a range from about 1 to about 25 micrometres. The moisture-activated adhesive layer has any useful width. In many embodiments the moisture-activated adhesive layer has a width in a range from about 1 to about 10 millimetres or from 1 to about 5 millimetres.

The rolling paper can be fabricated of a paper, homogenized paper, homogenized tobacco-impregnated paper, homogenized tobacco, wood pulp, hemp, flax, rice straw, and the like. The rolling paper can have any suitable basis weight. The basis weight of a rolling paper can be in a range from about 20 to about 100 grams per square meter or from about 20 to about 50 grams per square meter. A rolling paper can have any suitable thickness. The thickness of a rolling paper can be in a range from about 20 to about 100 micrometres or from about 20 to about 60 micrometres, or from about 30 to about 50 micrometres.

The rolling paper is sized to meet the common, standard rolling paper dimensions. Rolling paper is dimensionally referenced by the longitudinal dimension (length) and transverse dimension (width). The common form factor of a single rolling paper is a long rectangle having a narrow strip of glue or gum (moisture activated gum strip 130) along one of the long edges. Rolling papers are offered in standard lengths between 70 mm through 110 mm and a range of widths. The width of the rolling papers is commonly referenced using the designations of 1 (Single wide), 1¼ size, 1½ size and "Doublewide" (2 or 2.0). The 1 designation generally refers to papers having widths ranging from about 38 mm to about 45 mm. The 1¼ designation generally refers to papers having widths ranging from about 45 mm to about 65 mm. The 1½ designation generally refers to papers having widths ranging from about 50 mm to about 75 mm. The "doublewide" designation generally refers to papers having widths ranging from about 65 mm to about 90 mm. The typical length of rolling papers ranges from about 70 mm to about 80 mm, and a King Size length ranges from about 100 mm to about 110 mm.

In various embodiments, the rolling paper is hydrophobic or has one or more hydrophobic substrate regions. A hydrophobic rolling paper or rolling paper hydrophobic substrate region has a Cobb water absorption (ISO535:1991) value (at 60 seconds) of less than about 40 $g/m^2$, less than about 35 $g/m^2$, less than about 30 $g/m^2$, or less than about 25 $g/m^2$.

In various embodiments, the hydrophobic rolling paper or rolling paper hydrophobic region has a water contact angle of at least about 90 degrees, at least about 95 degrees, at least about 100 degrees, at least about 110 degrees, at least about 120 degrees, at least about 130 degrees at least about 140 degrees, at least about 150 degrees, at least about 160 degrees, or at least about 170 degrees. Hydrophobicity is determined by utilizing the TAPPI T558 om-97 test and the result is presented as an interfacial contact angle and reported in "degrees" and can range from near zero degrees to near 180 degrees. Where no contact angle is specified along with the term hydrophobic, the water contact angle is at least 90 degrees.

The hydrophobic surface can be uniformly present along the length of moisture-activated adhesive of the rolling paper. In some configurations the hydrophobic surface is not uniformly present along the length of the moisture-activated adhesive of the rolling paper. In some embodiments the hydrophobic surface forms a pattern along all or a portion of the length of the moisture-activated adhesive of the rolling paper.

The rolling paper includes a hydrophobic substrate region with hydrophobic groups covalently bonded to the rolling paper, and a moisture-activated adhesive adjacent to the hydrophobic substrate region and longitudinal edge of the rolling paper. In some embodiments, the moisture-activated adhesive is disposed on only a portion of the hydrophobic substrate region. In many embodiments, the moisture-activated adhesive, hydrophobic substrate region, and longitudinal edge of the rolling paper are coextensive with each other and the moisture-activated adhesive separates at least a portion of the hydrophobic substrate region from the longitudinal edge.

The rolling paper can be formed of any suitable cellulose material, preferably cellulose material derived from plants, as described above. In many embodiments the rolling paper is formed of a material with pendent protogenic groups. The term "protogenic" refers to a group that is able to donate a hydrogen or a proton in a chemical reaction. Preferably, the protogenic groups are reactive hydrophilic groups such as but not limited to a hydroxyl group (—OH), an amine group (—$NH_2$), or a sulfhydryl group (—$SH_2$). The invention will now be described, by way of example, with reference to rolling paper comprising hydroxyl groups. Material with pendent hydroxyl groups includes cellulosic material such as paper, wood, textile, natural as well as artificial fibers. The rolling paper can also include one or more filler materials, for example calcium carbonate or activated carbon.

The hydrophobic surface or region of the cellulosic material forming the rolling paper can be formed with any suitable hydrophobic reagent or hydrophobic group. The hydrophobic reagent is preferably chemically bonded to the cellulosic material or pendent protogenic groups of the cellulosic material forming the rolling paper. In many embodiments the hydrophobic reagent is covalently bonded to the cellulosic material or pendent protogenic groups of the cellulosic material. For example, the hydrophobic group is covalently bonded to pendent hydroxyl groups of cellulosic material forming the rolling paper. A covalent bond between structural components of the cellulosic material and the hydrophobic reagent can form hydrophobic groups that are more securely attached to the paper material than simply disposing a coating of hydrophobic material on the cellulosic material forming the rolling paper. By chemically bonding the hydrophobic reagent at the molecular level in situ rather than applying a layer of hydrophobic material in bulk to cover the surface allows the permeability of the paper to be better maintained, since a coating tends to cover or block pores in the cellulosic material forming the continuous sheet and reduce the permeability. Chemically bonding hydrophobic groups to the rolling paper in situ can also reduce the amount of material required to render the surface of the rolling paper hydrophobic. The term "in situ" as used herein refers to the location of the chemical reaction which takes place on or near the surface of the solid material that forms the rolling paper, which is distinguishable from a reaction with cellulose dissolved in a solution. For example, the reaction takes place on or near the surface of cellulosic material forming the rolling paper which comprises cellulosic material in a heterogeneous structure. However, the term "in situ" does not require that the chemical reaction takes place directly on cellulosic material forming the rolling paper.

The hydrophobic reagent may comprise an acyl group or fatty acid group. The acyl group or fatty acid group or mixture thereof can be saturated or unsaturated. A fatty acid group (such as a fatty acid halide) in the reagent can react with pendent protogenic groups such as hydroxyl groups of the cellulosic material to form an ester bond covalently bonding the fatty acid to the cellulosic material. In essence, these reactions with the pendent hydroxyl groups can esterify the cellulosic material.

In one embodiment of the invention, the acyl group or fatty acid group includes a $C_{12}$-$C_{30}$ alkyl (an alkyl group having from 12 to 30 carbon atoms), a $C_{14}$-$C_{24}$ alkyl (an alkyl group having from 14 to 24 carbon atoms) or preferably a $C_{16}$-$C_{20}$ alkyl (an alkyl group having from 16 to 20 carbon atoms). Those skill in the art would understand that the term "fatty acid" as used herein refers to long chain aliphatic, saturated or unsaturated fatty acid that comprises 12 to 30 carbon atoms, 14 to 24 carbon atoms, 16 to 20 carbon atoms or that has greater than 15, 16, 17, 18, 19, or 20 carbon atoms. In various embodiments, the hydrophobic reagent includes an acyl halide, a fatty acid halide, such as, a fatty acid chloride including palmitoyl chloride, stearoyl chloride or behenoyl chloride, a mixture thereof, for example. The in situ reaction between fatty acid chloride and cellulosic material forming the continuous sheet results in fatty acid esters of cellulose and hydrochloric acid.

Any suitable method can be utilized to chemically bond the hydrophobic reagent or group to the cellulosic material forming the rolling paper. The hydrophobic group is covalently bonded to the cellulosic material by diffusion of a fatty acid halide on its surface without using a solvent.

As one example, an amount of hydrophobic reagent, such as an acyl halide, a fatty acid halide, a fatty acid chloride, palmitoyl chloride, stearoyl chloride or behenoyl chloride, a mixture thereof, is deposited without solvent (solvent-free process) at the surface of the rolling paper at a controlled temperature, for example, droplets of the reagents forming 20-micrometer regularly-spaced circles on the surface. The control of the vapour tension of the reagent can promote the propagation of the reaction by diffusion with the formation of ester bonds between fatty acid and cellulose while continuously withdrawing unreacted acid chloride. The esterification of cellulose is in some cases based on the reaction of alcohol groups or pendent hydroxyl groups of cellulose with an acyl halide, such as an acyl chloride including a fatty acid chloride. The temperature that can be used to heat the hydrophobic reagent depends on the chemical nature of the reagent and for fatty acid halides, it ranges from about 120° C. to about 180° C.

The hydrophobic reagent can be applied to the cellulosic material of the rolling paper in any useful amount or basis weight. In many embodiments the basis weight of the hydrophobic reagent is less than about 3 grams per square meter, less than about 2 grams per square meter, or less than about 1 gram per square meter or in a range from about 0.1 to about 3 grams per square meter, from about 0.1 to about 2 grams per square meter, or from about 0.1 to about 1 gram per square meter. The hydrophobic reagent can be applied or printed on the rolling paper surface and define a uniform or non-uniform pattern.

Preferably the hydrophobic rolling paper is formed by reacting a fatty acid ester group or a fatty acid group with pendent hydroxyl groups on the cellulosic material of the rolling paper to form a hydrophobic surface. The reacting step can be accomplished by applying a fatty acid halide (such as chloride, for example) which provides the fatty acid ester group or a fatty acid group to chemically bond with pendent hydroxyl groups on the cellulosic material of the rolling paper to form a hydrophobic surface. The applying step can be carried out by loading the fatty acid halide in liquid form onto a solid support, such as a brush, a roller, or an absorbent or non-absorbent pad, and then contacting the solid support with a surface of the rolling paper. The fatty acid halide can also be applied by printing techniques, such as gravure, flexography, ink jet, heliography, by spraying, by wetting, or by immersion in a liquid comprising the fatty acid halide. The applying step can deposit discrete islands of reagent forming a uniform or non-uniform pattern of hydrophobic areas on the surface of the rolling paper. The uniform or non-uniform pattern of hydrophobic areas on the rolling paper can be formed of at least about 100 discrete hydrophobic islands, at least about 500 discrete hydrophobic islands, at least about 1000 discrete hydrophobic islands, or at least about 5000 discrete hydrophobic islands. The discrete hydrophobic islands can have any useful shape such as a circle, rectangle or polygon. The discrete hydrophobic islands can have any useful average lateral dimension. In many embodiments the discrete hydrophobic islands have an average lateral dimension in a range from 5 to 100 micrometres, or in a range from 5 to 50 micrometres. To aid diffusion of the applied reagent on the surface, a gas stream can also be applied. Apparatus and processes such as those described in US patent publication 20130236647, incorporated herein by reference in its entirety, can be used to produce the hydrophobic rolling paper.

According to the invention, a hydrophobic rolling paper can be produced by a process comprising applying a liquid composition comprising an aliphatic acid halide (preferably a fatty acid halide) to at least one surface of a rolling sheet, optionally applying a gas stream to the surface to aid diffusion of the applied fatty acid halide, and maintaining the surface at a temperature about 120° C. to about 180° C., wherein the fatty acid halide reacts in situ with the hydroxyl groups of the cellulosic material in the rolling sheet resulting in the formation of fatty acid esters. Preferably, the rolling sheet is made of paper, and the fatty acid halide is stearoyl chloride, palmitoyl chloride, or a mixture of fatty acid chlorides with 16 to 20 carbon atoms in the acyl group. The hydrophobic rolling sheet produced by a process described hereinabove is thus distinguishable from material made by coating the surface with a layer of pre-made fatty acid ester of cellulose.

The hydrophobic rolling sheet is produced by a process of applying the liquid reagent composition to the at least one surface of a rolling sheet at a rate of in a range from about 0.1 to about 3 grams per square meter, or from about 0.1 to about 2 grams per square meter, or from about 0.1 to about 1 gram per square meter. The liquid reagent applied at these rates renders the surface of the rolling sheet hydrophobic.

In many embodiments, the thickness of the rolling sheet allows the hydrophobic groups or reagent applied to one surface to spread onto the opposing surface effectively providing similar hydrophobic properties to both opposing surfaces. In one example, the thickness of the rolling sheet was about 43 micrometres and both surfaces were rendered hydrophobic by the gravure (printing) process using stearoyl chloride as the hydrophobic reagent to one surface.

In some embodiments, the material or method to create the hydrophobic nature of the hydrophobic filter element does not substantially affect the permeability of the rolling paper. Preferably, the reagent or method to create the hydrophobic rolling paper changes the permeability of the rolling paper (as compared to the untreated rolling paper) by less than about 10% or less than about 5% or less than 1%.

In many embodiments the hydrophobic surface can be formed by printing reagent along the length of the rolling paper. Any useful printing methods can be utilized. The reagent can include any useful hydrophobic groups that can be reacted to chemically bond to the rolling paper pendent groups of the cellulosic material.

In many embodiments the hydrophobic surface can be formed by printing reagent along the length of the cellulosic material. Any useful printing methods can be utilized such as gravure, ink jet and the like. The reagent can include any useful hydrophobic groups that can be covalently bonded to the cellulosic material or pendent groups of the cellulosic material.

Rolled smoking articles, such as cigarettes include a charge of tobacco circumscribed by a rolling paper. The charge of tobacco may comprise any suitable type or types of tobacco material or tobacco substitute, in any suitable form. Preferably, the tobacco includes flue-cured tobacco, Burley tobacco, Maryland tobacco, Oriental tobacco, specialty tobacco, homogenized or reconstituted tobacco, or any combination thereof. The term "tobacco cut filler" is used herein to indicate tobacco material that is predominately formed from the lamina portion of the tobacco leaf. The terms "tobacco cut filler" is used herein to indicate both a single species of *Nicotiana* and two or more species of *Nicotiana* forming a tobacco cut filler blend.

All scientific and technical terms used herein have meanings commonly used in the art unless otherwise specified. The definitions provided herein are to facilitate understanding of certain terms used frequently herein.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits under certain circumstances. However, other embodiments may also be preferred under the same or other circumstances. Furthermore, the recitation of one or more preferred embodiments does not imply that other embodiments are not useful, and is not intended to exclude other embodiments from the scope of the disclosure, including the claims.

FIG. 1 is a schematic perspective view of an illustrative rolling paper with a charge of tobacco disposed on the rolling paper.

The rolling paper depicted in FIG. 1 illustrates one or more embodiments of rolling paper or components of smoking articles described above. The schematic drawing is not necessarily to scale and is presented for purposes of illustration and not limitation. The drawing depicts one or more aspects described in this disclosure. However, it will be understood that other aspects not depicted in the drawing fall within the scope and spirit of this disclosure.

Referring now to FIG. 1, an illustrative rolling paper 12 with a charge of tobacco 52 disposed on the rolling paper, is depicted. The rolling paper 12 has a generally rectangular shape defined by opposing long (longitudinal) edges 14 and orthogonal opposing short (lateral) so edges 16. A layer or strip of moisture-activated adhesive 18 is disposed inwardly from one of the opposed long edges 14. A hydrophobic substrate region 20 is adjacent to the moisture-activated adhesive strip 18. Here, the moisture-activated adhesive 18, hydrophobic substrate region 20, and longitudinal edge 14 are coextensive with each other.

The exemplary embodiments described above are not limiting. Other embodiments consistent with the exemplary embodiments described above will be apparent to those skilled in the art.

The invention claimed is:

1. A rolling paper comprising:
   a hydrophobic substrate region comprising hydrophobic groups covalently bonded to the rolling paper; and
   a moisture-activated adhesive applied onto the hydrophobic substrate region and adjacent a longitudinal edge of the rolling paper.

2. The rolling paper according to claim 1, wherein the moisture-activated adhesive is disposed on only a portion of the hydrophobic substrate region.

3. The rolling paper according to claim 1, wherein the moisture-activated adhesive, hydrophobic substrate region, and longitudinal edge are coextensive with each other and the moisture-activated adhesive separates at least a portion of the hydrophobic substrate region from the longitudinal edge.

4. The rolling paper according to claim 1, wherein the hydrophobic substrate region has a water contact angle of at least about 90 degrees, or at least about 100 degrees.

5. The rolling paper according to claim 1, wherein the hydrophobic substrate region exhibits a Cobb measurement value (at 60 seconds) of about 40 g/m$^2$ or less.

6. The rolling paper according to claim 1, wherein the rolling paper has a basis weight in a range from about 10 to about 50 g/m$^2$ and the hydrophobic groups have a basis weight in a range from about 0.1 to about 5 g/m$^2$.

7. The rolling paper according to claim 1, wherein the rolling paper comprises cellulosic material and the hydrophobic groups are covalently bonded to cellulosic material by reacting in-situ a fatty acid halide with the cellulosic material.

8. A rolling paper according to claim 7, wherein the fatty acid halide is palmitoyl chloride, stearoyl chloride, behenoyl chloride, or a mixture of palmitoyl chloride and stearoyl chloride.

9. The rolling paper according to claim 7, wherein the rolling paper comprises fatty acid esters of cellulose.

10. The rolling paper according to claim 1, wherein moisture-activated adhesive comprises water-remoistenable natural gums.

11. A rolling paper according to claim 1, wherein the hydrophobic substrate region is produced by a process comprising the steps of: applying a liquid composition comprising a fatty acid halide to at least one surface of a rolling paper, maintaining the surface at a temperature of about 120° C. to about 180° C., wherein the fatty acid halide reacts in situ with protogenic groups of material in the rolling paper resulting in the formation of fatty acid esters.

12. A rolling paper according to claim 11, wherein the process comprises applying a liquid composition comprising stearoyl chloride or palmitoyl chloride to at least one surface of a rolling paper at a temperature of about 120° C. to about 180° C., wherein hydroxyl groups in cellulosic material of the rolling paper reacts in-situ with the stearoyl chloride or palmitoyl chloride.

13. A rolling paper according to claim 11, wherein the process comprises applying the liquid composition to a surface region of a rolling paper at a rate of in a range from about 0.1 to about 3 grams per square meter to render the surface region hydrophobic.

14. A rolling paper according to claim 11, wherein the process comprises disposing the moisture-activated adhesive onto a portion of the hydrophobic substrate region.

15. A rolling paper according to claim 11, wherein the process comprises applying a liquid composition comprising a fatty acid halide to a first major surface of a rolling paper, maintaining the first major surface at a temperature of about 120° C. to about 180° C., wherein the fatty acid halide reacts in situ with protogenic groups of material in the rolling paper resulting in the formation of fatty acid esters, and then applying the moisture-activated adhesive onto a second major surface of the rolling paper, wherein the second major surface opposes the first major surface.

16. A rolling paper according to claim 11, wherein the formation of the fatty acid esters is a solvent-free process.

* * * * *